United States Patent
Himmel (10) Patent No.: US 10,628,594 B2
(45) Date of Patent: Apr. 21, 2020

(54) MANAGING MULTI-TENANT SYSTEMS USING OBJECT-ORIENTED MODELS

(71) Applicant: SAP SE, Walldorf (DE)

(72) Inventor: Thorsten Himmel, Bad Schöborn (DE)

(73) Assignee: SAP SE, Walldorf (DE)

(*) Notice: Subject to any disclaimer, the term of this patent is extended or adjusted under 35 U.S.C. 154(b) by 254 days.

(21) Appl. No.: 15/416,117

(22) Filed: Jan. 26, 2017

(65) Prior Publication Data

US 2018/0211051 A1 Jul. 26, 2018

(51) Int. Cl.
*G06F 21/60* (2013.01)
*G06F 16/25* (2019.01)

(52) U.S. Cl.
CPC .......... *G06F 21/604* (2013.01); *G06F 16/252* (2019.01)

(58) Field of Classification Search
CPC ....... G06F 21/604; G06F 16/252; H04L 67/42
USPC ....................................... 707/705, 781, 821
See application file for complete search history.

(56) References Cited

U.S. PATENT DOCUMENTS

| 5,692,180 A * | 11/1997 | Lee .................. G06F 17/30327 |
| 9,800,464 B2 * | 10/2017 | McEntee ............ H04L 67/1097 |
| 2008/0208896 A1 * | 8/2008 | Yin .................... G06F 17/30306 |
| 2017/0109348 A1 * | 4/2017 | Nagaraj ............ G06F 17/30292 |

* cited by examiner

Primary Examiner — Hares Jami
(74) Attorney, Agent, or Firm — Fish & Richardson P.C.

(57) ABSTRACT

Methods, systems, and computer-readable storage media for providing a system that interacts with a plurality of tenant systems, the plurality of tenants including at least a first and a second tenant system, storing tenant-specific content in respective tenant namespaces, the tenant-specific content including first content of the first tenant system stored in a first tenant namespace, and second content of the second tenant system stored in a second tenant namespace, storing shared content in a shared namespace, the shared content including content that is not specific to a tenant in the plurality of tenants, storing an object-oriented data model (OOM) in the shared namespace, the OOM including two or more data objects, and one or more associations between data objects, and processing a request received from one of the first and the second tenant systems based on the OOM, the shared content, and one of the first and second content.

20 Claims, 5 Drawing Sheets

MANAGING MULTI-TENANT SYSTEMS USING OBJECT-ORIENTED MODELS

BACKGROUND

An enterprise can operate a software system that is accessed by a plurality of entities (e.g., customers). For example, the enterprise can provide software services that are accessed by the multiple entities in a multi-tenant configuration. An example software system can be provided to manage system landscapes of respective entities. In some examples, a system landscape includes a collection of respective systems operated by and/or on behalf of a particular entity. In extending such a software system to manage multiple system landscapes, various restrictions need to be implemented. Example restrictions can include ensuring host names are unique across all system landscapes, and maintaining system identifiers for clear separation between entities and/or system landscape.

For example, consider system landscapes of respective entities, each system landscape system containing one or more system identifiers (e.g., SID=ERP), each identifier is unique to a system of the respective system landscape. In some examples, each system identifier is unique within an entity's system landscape, but might not be unique across all system landscapes (e.g., a first system landscape of a first entity can include SID=ERP for a system in the first system landscape, and a second system landscape of a second entity can include SID=ERP for a system in the second system landscape). Consequently, an enterprise managing multiple system landscapes on behalf of multiple entities may encounter collisions between system identifiers. In some instances, identifier extensions can be used to distinguish between multiple systems (e.g., ERPABC, ERPDEF, where ABC and DEF are extensions for respective entities). However, it is up to the administrator of the enterprise to ensure a clear and consistent naming convention is implemented, and is followed by all entities. Another issue that arises is a lack of data separation between different system landscapes (e.g., separating data of the first entity and data of the second entity within systems of the enterprise managing system landscapes of the respective entities). Access restrictions based on which entity respective data belongs to can be overly complicated to be applied.

One approach can include providing multiple instances of the software services (e.g., multiple system landscape managers), one for each entity. This, however, multiplies the number of instances of the software services the service provider must provide and maintain. This multiplies the amount of technical resources required to provide all of the multiple instances, redundancy of shared data (e.g., multiple copies of data, even though the data is common to all instances), and the like. In effect, such an approach significantly impacts the total cost of ownership (TCO) in not only monetary, but also technical terms.

SUMMARY

Implementations of the present disclosure include computer-implemented methods for managing multi-tenant systems using object-oriented models. In some implementations, actions include providing a computer-implemented system that interacts with a plurality of tenant systems, the plurality of tenant systems including at least a first tenant system and a second tenant system, storing tenant-specific content in respective tenant namespaces, the tenant-specific content including first content of the first tenant system stored in a first tenant namespace, and second content of the second tenant system stored in a second tenant namespace, storing shared content in a shared namespace, the shared content including content that is not specific to a tenant in the plurality of tenant systems, storing an object-oriented data model in the shared namespace, the object-oriented data model including two or more data objects, and one or more associations between data objects, and processing a request received from one of the first tenant system and the second tenant system based on the object-oriented data model, the shared content, and one of the first content and the second content. Other implementations of this aspect include corresponding systems, apparatus, and computer programs, configured to perform the actions of the methods, encoded on computer storage devices.

These and other implementations can each optionally include one or more of the following features: processing the request includes determining that the request originates from a tenant context, and includes a write operation to the object-oriented data model, and in response, denying the request; processing the request includes determining that the request includes a write operation to tenant-specific content, and in response, performing the write operation on one of the first content and the second content; each of the tenant namespaces includes a using namespace that points to the shared namespace; processing the request includes determining that the request comprises one or more of a read operation on the object-oriented data model and data classified by the data model as shared, and in response directing the read operation to the shared namespace; the computer-implemented system includes a landscape management system that manages system landscapes of each tenant system in the plurality of tenant systems; and the object-oriented model includes a common information model (CIM) that is extended to enable model sharing between tenant systems of the plurality of tenant systems.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to managing multi-tenant systems using object-oriented models. More particularly, implementations of the present disclosure provide data separation for different tenants in a multi-tenant system, while supporting sharing of common content across tenants. In some implementations, an object-oriented data model contains objects (data objects) and associations between objects (e.g., associations also being provided as objects), where data storage is separated into namespaces, and each object resides in a single namespace. Implementations can include actions of providing a computer-implemented system that interacts with a plurality of tenant systems, the plurality of tenant systems including at least a first tenant system and a second tenant system, storing tenant-specific content in respective tenant namespaces, the tenant-specific content including first content of the first tenant system stored in a first tenant namespace, and second content of the second tenant system stored in a second tenant namespace, storing shared content in a shared namespace, the shared content including content that is not specific to a tenant in the plurality of tenant systems, storing an object-oriented data model in the shared namespace, the object-oriented data model including two or more data objects, and one or more associations between data objects, and processing a request received from one of the first tenant system and the second tenant system based on the object-oriented data model, the shared content, and one of the first content and the second content.

Implementations of the present disclosure are described in further detail herein with reference to an example context. The example context includes landscape management of multiple system landscapes. As described in further detail herein, and in accordance with the example context, implementations of the present disclosure provide multi-tenant landscape management using object-oriented models. The example context is non-limiting, and is used to illustrate implementations of the present disclosure. It is contemplated that implementations of the present disclosure can be realized in any appropriate context.

Figure 1:
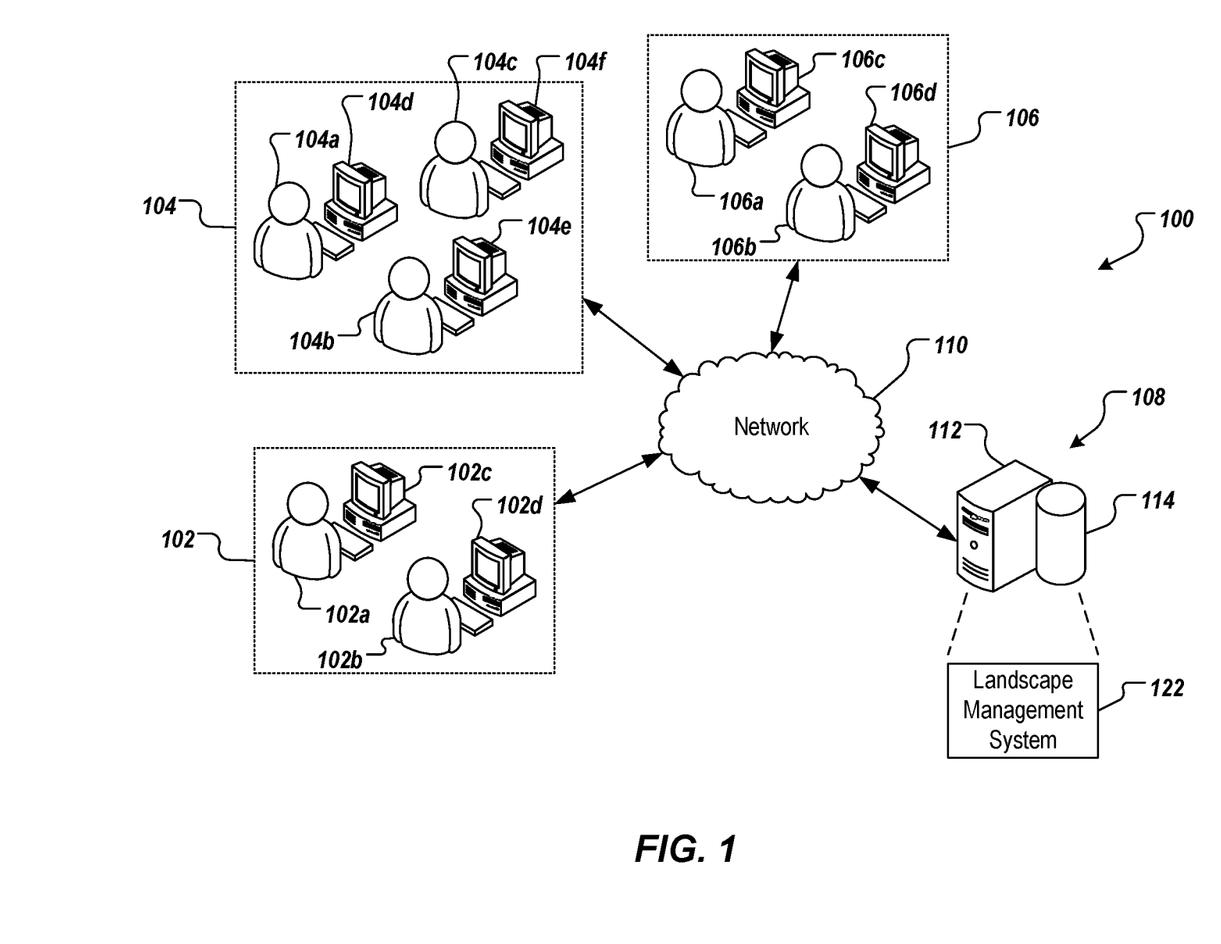
FIG. 1 depicts an example high-level architecture in accordance with implementations of the present disclosure.

FIG. 1 depicts an example architecture 100 in accordance with implementations of the present disclosure. The example architecture 100 is provided as a multi-tenant architecture and includes tenants 102, 104, 106 that communicate with a server system 108 over a network 110. In some examples, each tenant 102, 104, 106 includes multiple users 102a, 102b; 104a, 104b, 104c; 106a, 106b that use respective computing devices 102c, 102d; 104d, 104e, 104f; 106c, 106d to access the server system 108. In some examples, the computing devices 102c, 102d; 104d, 104e, 104f; 106c, 106d can be computing devices such as laptop computers, desktop computers, smartphones, personal digital assistants, portable media players, tablet computers, or other appropriate computing devices that can be used to communicate with the server system 108. Although the tenant system depicted in FIG. 1 includes user-operated computing devices, it is contemplated that one or more tenants can also include server systems. In some implementations, the server system 108 can include one or more computing devices such as a computer server 112 and one or more databases 114. In some implementations, the network 110 can be a public communication network (e.g., the Internet, cellular data network, dialup modems over a telephone network) or a private communications network (e.g., private LAN, leased lines).

In accordance with implementations of the present disclosure, the server system 108 can be a server system that executes a landscape management system 122. In the context of a multi-tenant architecture, an instance of the landscape management system 122 is used to manage system landscapes of the respective tenants 102, 104, 106. Accordingly, a server instance shared by multiple tenants is provided, where each tenant is provided with a dedicated share of the instance, which is isolated from other shares with regard to performance and data privacy.

In some implementations, one or more data stores of the server system 108 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

As introduced above, and described in further detail herein, implementations of the present disclosure provide for managing multi-tenant systems using object-oriented models. In accordance with the example context, tenant-enabled landscape management using object-oriented models is described in further detail herein. In some examples, landscape management is performed by a computer-implemented landscape management system (e.g., the landscape management system 122 of FIG. 1). An example landscape management system includes the SAP Solution Manager provided by SAP SE of Walldorf, Germany.

In general, the landscape management system manages software systems provided on a plurality of system landscapes of respective entities. For example, a first entity can include a first plurality of software applications that make up a first system landscape, and a second entity can include a second plurality of software applications that make up a second system landscape. In some examples, the first system landscape and the second system landscape are unique relative to one another. For example, the first landscape system can include one or more applications, versions of applications, and/or dependencies between applications, among other features, not included in the second system landscape, and vice-versa.

In some examples, the landscape management system is informed by respective system landscape directories (SLDs), which indicate the applications, versions of applications, and/or dependencies between applications, among other features, provided in a respective system landscape. In some examples, the landscape management system uses this information to manage the respective system landscapes by, among other functions, supporting maintenance procedures, and/or upgrade procedures, as well as providing requisite system landscape documentation. For example, in performing an upgrade procedure of an application within a system landscape (e.g., from a first version to a second version), the system landscape directory can indicate whether the application has any dependencies on other applications in the system landscape, which would also be accounted for in the upgrade procedure. The system landscape directory can also provide other information that is specific to the respective system landscape, such as host names, and virtual host names (e.g., identifiers that uniquely identify servers/virtual servers within the respective system landscape).

Figure 2:
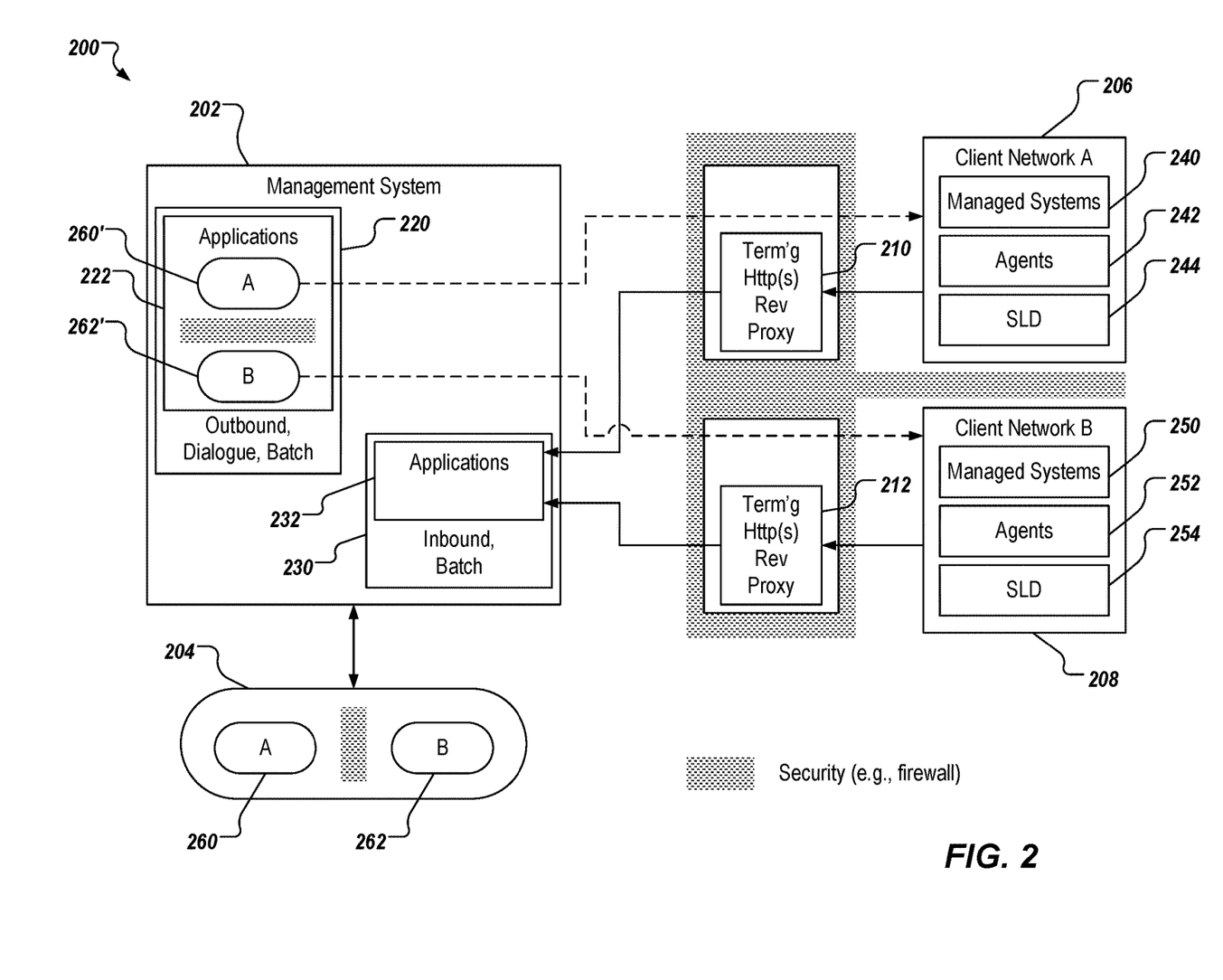
FIG. 2 depicts an example architecture for landscape management in accordance with implementations of the present disclosure.

FIG. 2 depicts an example architecture 200 for landscape management in accordance with implementations of the present disclosure. In the depicted example, the example architecture 200 includes a management system 202 (e.g., executed on the server system 108 of FIG. 1), a database system 204 (e.g., hosted on the server system 108 of FIG. 1), a first client network 206 (e.g., one of the tenants 102, 104, 106 of FIG. 1), and a second client network 208 (e.g., another of the tenants 102, 104, 106 of FIG. 1). Although only two client networks are depicted in the example of FIG. 2, it is contemplated that any appropriate number of client networks (tenants) can be included. The first client network 206 and the second client network 208 each communicate with the management system 202 over a network (e.g., the network 110 of FIG. 1). The first client network 206 communicates with the management system 202 through a proxy 210, and the second client network 208 communicates with the management system 202 through a proxy 212. In the depicted example, the management system 202 includes an outbound component 220 including application instances 222, and an inbound component 230 including application instances 232.

In accordance with implementations of the present disclosure, each of the proxies 210, 212 is provided as a reverse proxy. In some examples, a reverse proxy is provided as a proxy server that retrieves resources on behalf of a client (e.g., the first client network 206, the second client network 208) from one or more servers (e.g., the servers hosting the management system 202 and the database system 204). The retrieved resources are returned to the respective client, as if they had originated from the proxy 210, 212. In some implementations, and as described in further detail herein, incoming data can be assigned to the proper namespace based on the reverse proxy 210, 212 that is sending the data to the management system 202.

The management system 202 maps incoming requests to the proper namespace according to the reverse proxy that a respective request originates from. In some examples, a uniform resource locator (URL) parameter can be used. For example, a URL used by the first client network 206 (e.g., revproxyA/example) is mapped to a corresponding URL (e.g., mgmtsystem/example!tenant=A) by the reverse proxy 210, which URL is provided to the management system 202. In this manner, the management system 202 is informed that "tenant=A" uniquely denotes the first client network 206, and can access the corresponding namespace in its database. In some examples, user authentication can be used. For example, each reverse proxy 210, 212 uses a unique user account when authenticating to the management system 202, while sending a request. Analogous to the URL parameter, the user can be mapped to their respective client network (or tenant), and thereby, the respective namespace. Implementations can include other options for determining the namespace corresponding to an incoming request (e.g., host name or IP address of the reverse proxy, anything that can identify it reliably). In general, however, mapping to the namespace is not controlled by anything in the client networks themselves. Instead, the mapping is based in the one-to-one relationship between tenant, reverse proxy, and storage namespace in the management system 202. Both the management system 202, and the reverse proxies 210, 212 are under the control of the service provider, the client networks 206, 208 are not.

In the depicted example, the first client network 206 includes one or more managed system 240, one or more agents 242, a SLD 244, and the second client network 208 includes one or more managed system 250, one or more agents 252, a SLD 254. In some examples, the managed systems 240 include one or more applications that are included in the system landscape of the first client network 206, and the managed systems 250 include one or more applications that are included in the system landscape of the second client network 208. The SLD 244 provides the applications, versions of applications, and/or dependencies between applications, among other features, included in the first client network 206, and the SLD 254 provides the applications, versions of applications, and/or dependencies between applications, among other features, included in the second client network 208. In some examples, the management system 202 is informed by the respective SLDs 244, 254 (each SLD 244, 254 being informed by respective SLD data suppliers of the client networks 206, 208 (not shown)). In this manner, the management system 202 has a view into the respective system landscapes.

Although FIG. 2 depicts SLDs 244, 254 of the respective client networks 206, 208, it is contemplated that the SLDs 244, 254 can be optional. As discussed above, a SLD provides data to the management system, which the SLD itself receives from a SLD data suppliers (DS). However, the SLD DS can send its data directly to the management system 202 through the respective reverse proxy. In this manner, a dedicated SLD in the client network can be foregone. Use of an SLD in a client network can be a total cost of ownership (TCO). For example, if the client network already includes a SLD, it may be more efficient to use the SLD as the "single" data source. In contrast, if a SLD is not included in the client network (e.g., and the client network does not require a SLD), it can be more efficient to connect SLD DSs directly to the management system 202, rather than setting up a separate SLD that is otherwise not needed.

In accordance with implementations of the present disclosure, tenant-enabled landscape management is provided based on an object-oriented data model, also referred to as data model herein. As described in further detail herein, implementations of the present disclosure provide strict data separation for different tenants, while supporting sharing of common content (data) across tenants. In some implementations, the object-oriented data model includes data objects and associations. In some examples, each association is provided as a data object. In some examples, data storage is separated into namespaces, and each data object resides in a respective namespace.

An example object-oriented data model includes the common information model (CIM) provided by Distributed Management Task Force, Inc. of Portland, Oreg. USA. Although implementations of the present disclosure are described in further detail herein with reference to the CIM, it is contemplated that implementations of the present disclosure can be realized using any appropriate data model. In general, and as described in detail herein, implementations of the present disclosure extend the CIM to tenant-enable the CIM.

With particular reference to the CIM, the CIM provides a definition of management information for systems, networks, applications and services, and is based on a CIM standard, which includes a schema, a specification, and a meta-model. In some examples, the schema provides the actual model descriptions, and provides the building-blocks for management platforms and management applications, such as device configuration, performance management, and change management. The schema, and thus the CIM, structures the managed environment as a collection of interrelated systems, each composed of discrete elements. In some examples, the schema includes a set of classes with properties and associations that provide a well-understood conceptual framework. In some examples, the schema is structured into a core model layer, a common model layer, and an extension schemas layer.

In some examples, the specification defines the details for integration with other management models. For example, an information model can require a set of legal statement types (or syntax), and a collection of expressions to manage common aspects of the domain (in this case, complex computer systems). In the CIM, the information for performing tasks is organized in a manner that enables disparate groups of people to use it. In some examples, the meta-model defines the semantics for the construction of conformant models, and the schema that represents those models. The meta-model also enables extension of its elements through the use of qualifiers.

In accordance with implementations of the present disclosure, the data model is independent of the software. In this manner, for example, the data model can be imported and updated at runtime without changing the software (e.g., hardcoding into the software), or database table layout. In some implementations, data of different tenants is separated into respective namespaces, each namespace being associated with a respective tenant. In some examples, a namespace provides a scope of uniqueness for contained objects (e.g., the names of classes (in the data model), the names of instances (the data content) are unique inside a namespace). In some examples, names (e.g., system identifiers (SIDs)) need not be unique across namespaces. Consequently, names can be discerned by including the namespace name in accordance with implementations of the present disclosure.

In some examples, incoming data (e.g., data coming from a respective tenant) can be automatically mapped to the proper namespace (tenant namespace). For example, and with reference to FIG. 2, data 260, 260' is specific to the first client network 206, and data 262, 262' is specific to the second client network 208. In accordance with implementations of the present disclosure, client-specific data is stored in respective namespaces (e.g., namespace A for data specific to the first client network 206, namespace B for data specific to the second client network 208).

In some implementations, shared data resides in a shared namespace. Some data may be common to all client networks managed by the landscape management system. By way of analogy, an online e-commerce platform includes data that is common to all customers (e.g., catalog of products sold through the e-commerce platform), and data that is specific to respective customers (e.g., customer profiles, transaction histories).

In accordance with implementations of the present disclosure, the data model itself is stored in the shared namespace. In some implementations, to support sharing data, associations can connect data objects across namespace boundaries. In this manner, associations between tenant data and shared data can be provided. To ensure associations across namespace boundaries do not violate strict data separation between tenants, one or more rules are applied. Example rules can include that all classes (including association classes) in the data model are classified as to whether they belong to the domain of a tenant, or shared data, only association classes connecting tenant and shared data are able to cross namespace boundaries, the relation between a tenant namespace and a shared namespace is explicitly defined, and associations across namespaces must match the explicitly defined namespace relations.

In accordance with implementations of the present disclosure, because the tenant data is separated into namespaces, and each data object's fully qualified name contains the namespace, data of different tenants cannot clash. An example fully-qualified name can include //mgmtsystem/tenantA: SAP_ComputerSystem.Name= "example, " which denotes an instance of class SAP_ComputerSystem with the host name "example." The fully-qualified name resides on the managing system "mgmtsystem" in the namespace "tenantA." The name is considered fully-qualified, because it includes the instance name, the namespace, and the system containing this namespace. In this example, the instance name alone would just be SAP_ComputerSystem.Name="example." Without further context information, it could not be discerned as to which tenant it belongs to, because the host name "example" could exist in any tenant landscape. By using fully-qualified names, there is no need to provide or enforce a tenant-independent naming convention. For example, each tenant namespace can represent a network segment, and within each network segment, host names are unique. Because of the namespace separation of the present disclosure, identical host names in different network segments (which often occur) can be handled (e.g., without using identifier extensions).

In accordance with implementations of the present disclosure, and when working in the context of a single tenant, sharing of common content and associations between the tenant namespace and the shared namespace can be hidden from the tenant (e.g., user, client application). From the tenant's perspective, tenant data and shared data appear to reside in the same namespace. The tenant's system landscape does not need to be enabled to handle associations across namespaces. In some implementations, reading all data (tenant or shared) is possible, while writing is only possible for tenant data. In some implementations, and when working in the context of shared data, or for analysis or administration across tenants (e.g. how many tenants refer to a given shared data object), sharing and associations between namespaces are visible to the application, and reading and writing of all data is possible. In both scenarios, permission checks can be implemented to restrict access at the tenant level.

In some examples, a distinction between a (client) application, and a tenant can be provided. For example, application code may run on behalf of a tenant. As discussed herein, the client application will only process its own tenant data and shared data, and remains unaware that there is sharing of data/namespaces in place. For analysis, or administration across tenants, sharing and associations are visible to the application code. Accordingly, there is a given tenant context, while in (2) there is not. Depending on the analysis we just get a result which may contain shared data and data of several tenants. For each result object the namespace/tenant is known, but there is no given tenant context as in (1).

In accordance with implementations of the present disclosure, maintaining shared data only once for several tenants provides efficiencies in TCO. For example, storage volume is decreased, and updates to the shared content need to be applied only once, which decreases load on processors, memory, and the like.

In some implementations, multiple shared namespaces offering different versions of shared content can be used for different groups of tenant namespaces. Given that the associations across namespaces are clearly defined semantically, migrating a tenant namespace from one shared namespace to another shared namespace can be achieved without data loss.

Figure 3:
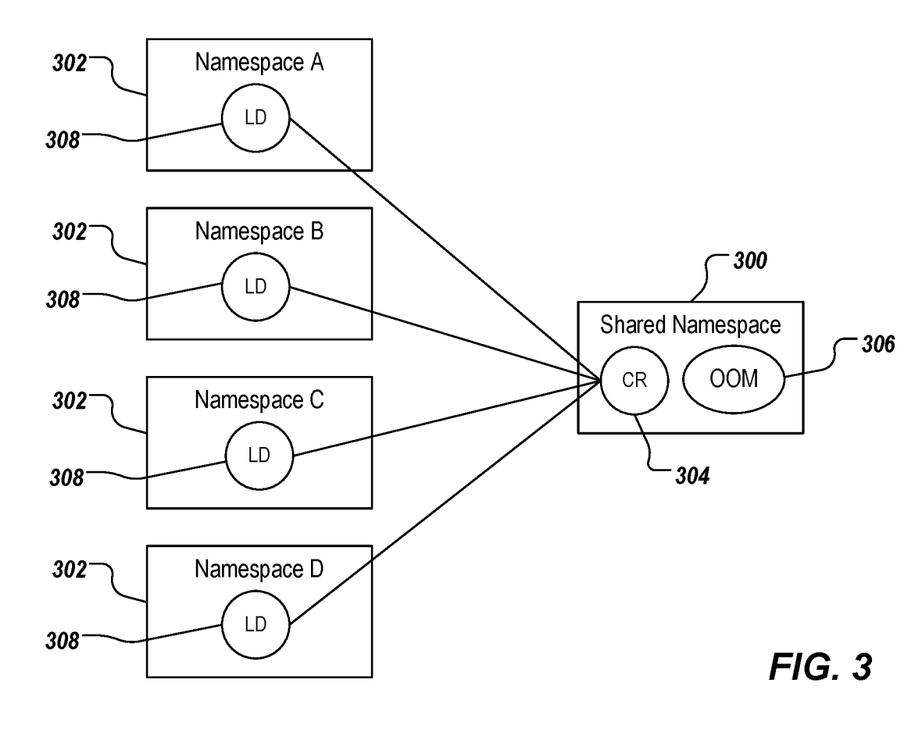
FIG. 3 depicts a conceptual diagram for namespace-based storage in accordance with implementations of the present disclosure.

FIG. 3 depicts a conceptual diagram for namespace-based storage in accordance with implementations of the present disclosure. In the examples of FIG. 3, a shared namespace 300, and respective tenant namespaces 302 are provided. Shared data (CR) 304 and an object-oriented model (OOM) 306 (e.g., a CIM model) are stored in the shared namespace 300. Each tenant namespace 302 is specific to a respective tenant (e.g., entity), and has tenant-specific data (LD) 308 stored therein.

In accordance with implementations of the present disclosure, the data model, CIM model, is shared across namespaces. In some examples, a database (e.g., the database system 204 of FIG. 2) may contain dozens or hundreds of namespaces, across which the data model is to be shared. This is particularly the case in the example context (landscape management), where each client network segment is represented by a separate namespace. By sharing the data model across the namespaces, all namespaces use the same data model. In this manner, persistence and shared memory footprint are not multiplied by the number of namespaces, and the data model is imported and updated only once.

In some implementations, each namespace is of a particular type of namespace. Example types include shared, using, and individual. In some examples, a shared namespace (e.g., the shared namespace 300 of FIG. 3) provides the data model for other namespaces, as discussed herein. In some examples, a using namespace (e.g., a tenant namespace 302 of FIG. 3) uses the data model of another namespace (shared namespace). In some examples, an individual namespace uses its own data model. In some implementations, write operations on the data model are only allowed in the shared namespace(s), and individual namespace(s) only, and are prohibited in the using namespaces. In some implementations, read operations on the data model in a using namespace are internally redirected to the respective shared namespace. In some examples, a using namespace itself does not contain any model objects. In this manner, gaps or errors in the redirect logic can be detected. For example, requests not properly redirected to the shared namespace will fail due to missing data model information.

In some implementations, more than one shared namespace can be provided. Accordingly, a configuration of a using namespace specifies the corresponding shared namespace. In some examples, chaining of namespaces is not required. That is, for example, a using namespace does not play the role of a shared namespace for other using namespaces. In this manner, implementations of the present disclosure reduce complexity.

In some implementations, a namespace configuration is provided and indicates the namespaces, and, for each namespace, a respective type (e.g., shared, using, individual). In some examples, the namespace configuration can be provided in an existing table (e.g., stored in the database system). An example table includes LMDB_P_NAMESPACE, a table provided with the SAP Solution Manager. For example, the existing table, LMDB_P_NAMESPACE, can be extended to include additional fields. Example fields include a field that indicates namespace type (e.g., SHARING_CATEGORY field), and a field that indicates identifiers of shared namespaces (e.g., SHARED_NSP_ID field).

In some implementations, an object manager is provided. In the example of CIM, the object manager includes the CIM object manager (CIMOM). In some examples, a CIMOM request is represented as a request object. The request object includes the request's target namespace (e.g., the tenant namespace of the client network submitting a request to the system landscape manager). For example, the request can include a field (e.g., target_namespace) (public, read-only) in a class (e.g., CL_LMDB_WBEM_REQUEST). In some examples, any access to model information uses the target namespace. This can apply to both explicit access for model requests (e.g., GetClass), and implicit access for instance requests (e.g., GetInstance).

In some implementations, sharing of the data model in accordance with implementations of the present disclosure also affects the CIMOM locking concept. For example, a model update uses appropriate locks to prohibit concurrent instance changes in the same namespace. For a shared namespace, however, these locks must also affect all using namespaces. In some implementations, this can be achieved either by acquiring instance locks for all affected using namespaces, or by acquiring instance locks generically for all namespaces. The latter is less scalable, but much simpler to realize and not prone to resource exhaustion in the enqueue service. Given that model updates are relatively rare, utmost scalability may not be a deciding factor. In some implementations, while adapting the CIMOM locking, the lock timeout for model updates can be revised. For example, lock acquisition can use a longer timeout than in non-sharing (traditional) implementations. Otherwise model updates are likely to fail in large scale scenarios due to instance locks.

Implementations of the present disclosure are described in further detail with reference to example use cases.

In a first example use case, a single object can be retrieved from a tenant namespace. In this example, a tenant sends a request including parameters Operation=GetInstance, and Object=SAP_ComputerSystem.Name="example." A respective reverse proxy identifies the tenant by adding the URL parameter "tenant=A" to the request. The management system receives the request, maps "tenant=A" to the namespace A (assuming that is the proper namespace for the tenant), and executes the operation using A as the target namespace. In some examples, during execution of the operation, the management system may need to access the data model. Namespace A is a using namespace linked to a given shared namespace. Consequently, the management system will read the required model entity from the shared namespaces, and data about the requested object from namespace A. The response is assembled, and is sent back to the client, no namespace information is included in the response.

In a second example use case, a shared object is retrieved. In this example, the tenant sends a request that includes Operation=GetInstance, Object=SAP_Software Component.Name="example." The difference here, as compared to the first example use case, is that this is not a tenant-specific object, but a shared object (e.g., from the SAP Software Catalog), which is the same for all tenants, and resides in the shared namespace. A respective reverse proxy identifies the tenant by adding the URL parameter "tenant=A" to the request. The management system receives the request, maps "tenant=A" to the namespace A (assuming that is the proper namespace for the tenant), and executes the operation using A as the target namespace. In this example, both the data model and the data of the requested object reside in the shared namespace. With the classification in the data model itself, the implementation knows that the data resides in the shared namespace instead of the actual target namespace A. The response is assembled, and is sent back to the client, no namespace information is included in the response.

In a third example use case, all tenant objects associated with a given shared object are retrieved by a system administrator, as opposed to a tenant. In this example, a request is submitted that includes Operation=Associators, Object=SAP_SoftwareComponent.Name="example," and Namespace=shared namespace. In this example, objects connected to the shared object are being requested through respective associations, and not the shared object itself. In some examples, the associations may be crossing namespace boundaries. No reverse proxy is involved in this example. The target namespace (the shared namespace in this example) is given as part of the request. Data is read in response to the request to provide a result that can contain objects from multiple namespaces. The response is assembled, and is sent back to the client, this time including namespace information for each object in the response, otherwise the information whether it is shared data or to which tenant it belongs would be lost.

A fourth example use case can include the third example use case, but in a tenant context. In this example, a tenant sends a request including Operation=Associators, and Object=SAP SoftwareComponent.Name="example." A respective reverse proxy identifies the tenant by adding the URL parameter "tenant=A" to the request. The management system receives the request, maps "tenant=A" to the namespace A (assuming that is the proper namespace for the tenant), and executes the operation using A as the target namespace. In this example, processing starts the same as discussed above with respect to the second example use case (e.g., processing is redirected to the shared namespace). However, due to the association traversal, result candidates may be found (a) in the shared namespace, (b) the tenant namespace A, which is the request target namespace, and/or (c) other tenant namespace(s). In this example, objects from (a) and (b) are part of the result, while objects from (c) are filtered out, because they represent data of other tenants. The response is assembled, and is sent back to the client, no namespace information is included in the response.

In accordance with implementations of the present disclosure, and as highlighted in one or more of the example use cases, a request to the management system either declares the request target namespace explicitly (for actions initiated on the management system), or is mapped to the proper request target namespace by the reverse proxy, which sends the request to the management system. If a request coming from a tenant (through a respective reverse proxy) explicitly states the request target namespace, this is either redundant (because it is in accordance with the namespace given by the reverse proxy's mapping), or the request will be rejected (because the given namespace is not valid for the tenant). In some examples, internal processing uses the classification information in the data model, and the configured relations between namespace to retrieve data from the proper namespace(s) (e.g., the request target namespace or the related shared namespace). By the same means, the scope of the result can be determined (e.g., view for one tenant, view for all tenants). In some examples, the result contains no namespace information (view for one tenant), or the required namespace information (view for all tenants). Only tools working with the latter need to be aware of tenant enablement, and therefore, of associations across namespaces.

Figure 4:
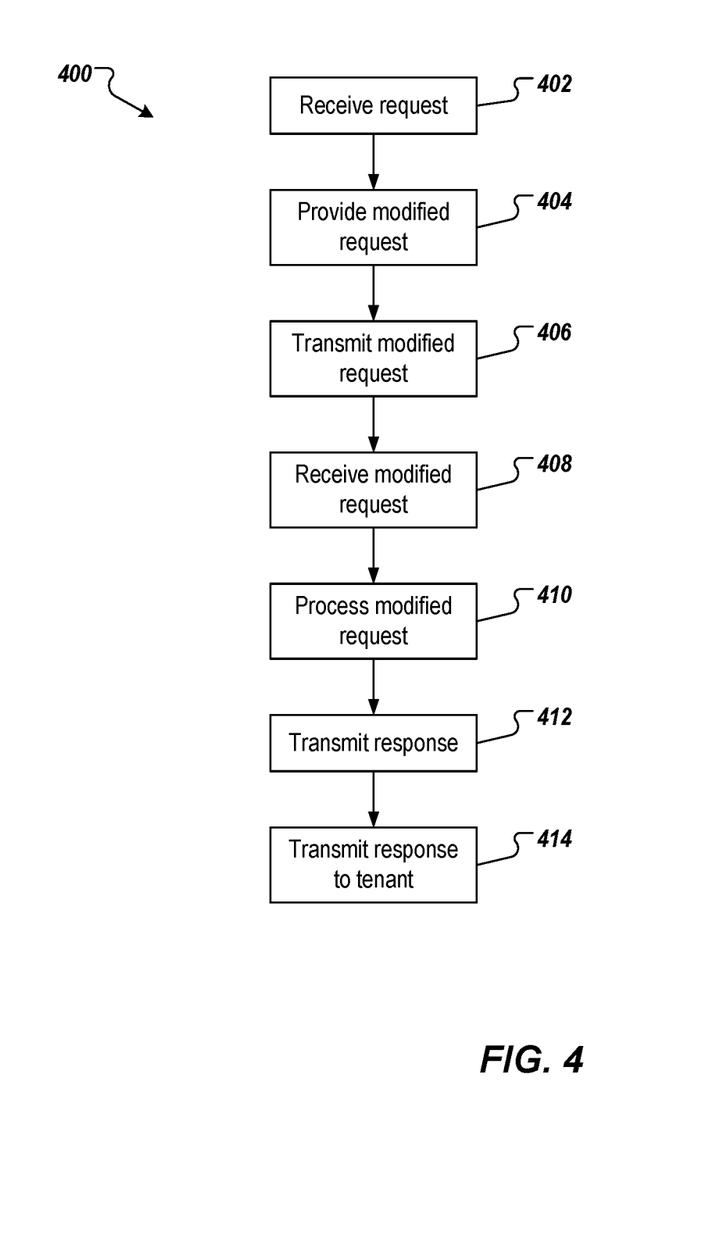
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices. In some examples, the example process 400 can be executed in accordance with a tenant context (e.g., a tenant submitting a request to a management system).

A request is received (402). For example, a reverse proxy (e.g., the reverse proxy 210 of FIG. 2) receives a request from a tenant (e.g., the client network 206 of FIG. 2). In some examples, the request includes parameters indicating an operation that is to be performed (e.g., Operation=GetInstance, and Object=SAP_Computer System.Name ="example"). Example operations can include retrieving an object from a tenant namespace, and/or retrieving a shared object from a shared namespace. A modified request is provided (404). For example, the respective reverse proxy modifies the request to include a parameter that identifies the tenant (e.g., by adding the URL parameter "tenant=A" to the request). The modified request is transmitted to the management system (406). For example, the reverse proxy transmits the modified request to management system.

The management system receives the modified request (408), processes the modified request (410), and transmits a response (412). For example, the management system maps "tenant=A" to the namespace A (assuming that is the proper namespace for the tenant), and executes the operation using A as the target namespace. In some examples, during execution of the operation, the management system may need to access the data model. Namespace A is a using namespace linked to a given shared namespace. Consequently, the management system will read the required model entity from the shared namespaces, and data about the requested object from namespace A. The response is assembled, and is sent back to the reverse proxy, no namespace information is included in the response. The response is transmitted to the tenant (414). For example, the reverse proxy transmits the response to the tenant.

Implementations of the present disclosure provide one or more of the following example advantages. In some examples, implementations of the present disclosure reduce TCO, and the resource footprint (e.g., number of technical resources). For example, implementations of the present disclosure enable one management system required for multiple tenants, instead of one management system per tenant. Further, internal to the management system, the same consideration applies. For example, the data model, and shared content are each stored only once, and are updated centrally, once for all tenants. Implementations of the present disclosure also improve scalability. For example, without sharing, the number of tenants that can be supported would become severely limited by the n-fold storage and maintenance of data model and shared content that would be required. Implementations of the present disclosure are also compatible with non-tenant enabled tools. For example, tools interacting with the management system can be used as before. However, instead of communicating with a management system in the client network of the tenant, the tools communicate with a new tenant-enabled management system through a reverse proxy. The tools need not be aware of tenant enablement, shared namespaces, and the like (e.g., as described herein, no such information is visible to the client networks). The tenant is not aware whether the respective reverse proxy connects to a tenant-enable management system, or a management system dedicated to this one tenant.

Implementations of the present disclosure further enhance extensibility. For example, classification of shared data versus tenant data in the data model itself enables extension at runtime without software changes. Further, security and reliability are enhanced. For example, the same classification in the data model itself ensures the system can reliably separate data and control access to it. Implementations of the present disclosure also enhance versioning. For example, different versions of shared content or the data model can be used by using respective shared namespaces. Migration of a tenant namespace from one shared namespace to another (i.e. from one version to another) is possible to the explicit classification in the data model, and the explicit association across namespaces (which are the main objects to be checked or adapted migration.)

Figure 5:
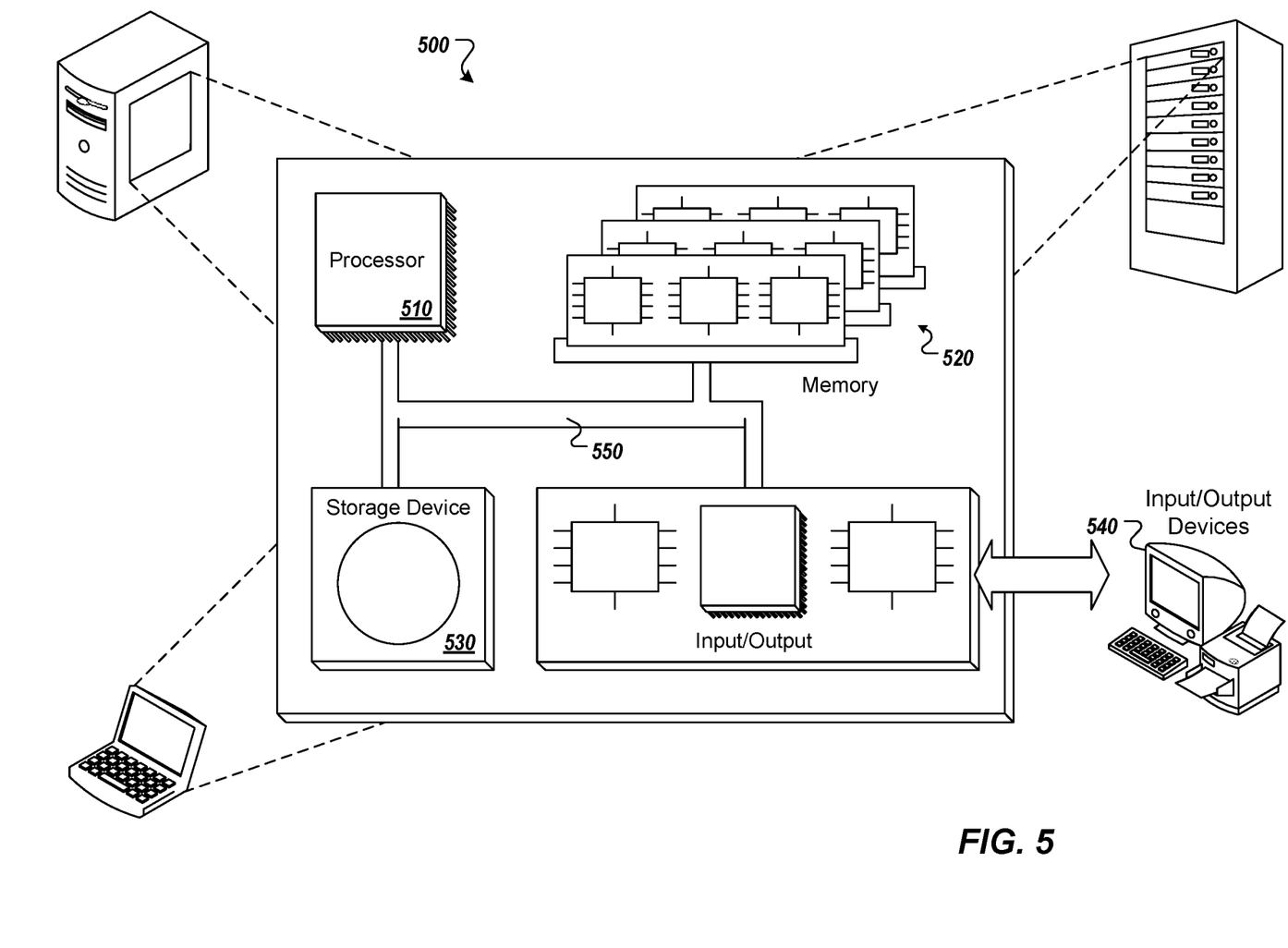
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing a multi-tenant system, the method being executed by one or more processors and comprising:
   providing, by the one or more processors, a computer-implemented system that interacts with a plurality of tenant systems, the plurality of tenant systems comprising at least a first tenant system and a second tenant system;
   storing, by the one or more processors, tenant-specific content in respective tenant namespaces, the tenant-specific content comprising first content of the first tenant system stored in a first tenant namespace, and second content of the second tenant system stored in a second tenant namespace, the first content having a first fully qualified name associated therewith and comprising the first tenant namespace, and the second content having a second fully qualified name associated therewith and comprising the second tenant namespace;
   storing, by the one or more processors, shared content in a shared namespace, the shared content comprising content that is not specific to a tenant in the plurality of tenant systems;
   storing, by the one or more processors, a shared data model provided as an object-oriented data model in the shared namespace, the shared data model being shared across a plurality of tenant namespaces and comprising two or more data objects, and one or more associations between data objects, each association connecting data objects from one of the first tenant namespace and the second tenant namespace to the shared namespace, one or more rules being applied to the shared data model to ensure associations across namespace boundaries do not violate strict data separation between tenants; and
   processing, by the one or more processors, a request received from one of the first tenant system and the second tenant system based on the shared data model, the shared content, and one of the first content and the second content to provide a response, the request being mapped to the one of the first tenant system and the second tenant system by a reverse proxy using one of the first fully qualified name and the second fully qualified name, respectively, the response comprising data of one of the first content and the second content in the shared data model with the shared content and selectively including a namespace.

2. The method of claim 1, wherein processing the request comprises determining that the request originates from a tenant context, and comprises a write operation to the object-oriented data model, and in response, denying the request.

3. The method of claim 1, wherein processing the request comprises determining that the request comprises a write operation to tenant-specific content, and in response, performing the write operation on one of the first content and the second content.

4. The method of claim 1, wherein each of the tenant namespaces comprises a using namespace that points to the shared namespace.

5. The method of claim 4, wherein processing the request comprises determining that the request comprises one or more of a read operation on the object-oriented data model and data classified by the data model as shared, and in response directing the read operation to the shared namespace.

6. The method of claim 1, wherein the computer-implemented system comprises a landscape management system that manages system landscapes of each tenant system in the plurality of tenant systems.

7. The method of claim 1, wherein the object-oriented model comprises a common information model (CIM) that is extended to enable model sharing between tenant systems of the plurality of tenant systems.

8. A non-transitory computer-readable storage medium coupled to one or more processors and having instructions stored thereon which, when executed by the one or more processors, cause the one or more processors to perform operations for providing a multi-tenant system, the operations comprising:
   providing a computer-implemented system that interacts with a plurality of tenant systems, the plurality of tenant systems comprising at least a first tenant system and a second tenant system;
   storing tenant-specific content in respective tenant namespaces, the tenant-specific content comprising first content of the first tenant system stored in a first tenant namespace, and second content of the second tenant system stored in a second tenant namespace, the first content having a first fully qualified name associated therewith and comprising the first tenant namespace, and the second content having a second fully qualified name associated therewith and comprising the second tenant namespace;
   storing shared content in a shared namespace, the shared content comprising content that is not specific to a tenant in the plurality of tenant systems;
   storing a shared data model provided as an object-oriented data model in the shared namespace, the shared data model being shared across a plurality of tenant namespaces and comprising two or more data objects, and one or more associations between data objects, each association connecting data objects from one of the first tenant namespace and the second tenant namespace to the shared namespace, one or more rules being applied to the shared data model to ensure associations across namespace boundaries do not violate strict data separation between tenants; and
   processing a request received from one of the first tenant system and the second tenant system based on the shared data model, the shared content, and one of the first content and the second content to provide a response, the request being mapped to the one of the first tenant system and the second tenant system by a reverse proxy using one of the first fully qualified name and the second fully qualified name, respectively, the response comprising data of one of the first content and the second content in the shared data model with the shared content and selectively including a namespace.

9. The computer-readable storage medium of claim 8, wherein processing the request comprises determining that the request originates from a tenant context, and comprises a write operation to the object-oriented data model, and in response, denying the request.

10. The computer-readable storage medium of claim 8, wherein processing the request comprises determining that the request comprises a write operation to tenant-specific content, and in response, performing the write operation on one of the first content and the second content.

11. The computer-readable storage medium of claim 8, wherein each of the tenant namespaces comprises a using namespace that points to the shared namespace.

12. The computer-readable storage medium of claim 11, wherein processing the request comprises determining that the request comprises one or more of a read operation on the object-oriented data model and data classified by the data model as shared, and in response directing the read operation to the shared namespace.

13. The computer-readable storage medium of claim 8, wherein the computer-implemented system comprises a landscape management system that manages system landscapes of each tenant system in the plurality of tenant systems.

14. The computer-readable storage medium of claim 8, wherein the object-oriented model comprises a common information model (CIM) that is extended to enable model sharing between tenant systems of the plurality of tenant systems.

15. A system, comprising:
a computing device; and
a computer-readable storage device coupled to the computing device and having instructions stored thereon which, when executed by the computing device, cause the computing device to perform operations for providing a multi-tenant system, the operations comprising:
   providing a computer-implemented system that interacts with a plurality of tenant systems, the plurality of tenant systems comprising at least a first tenant system and a second tenant system;
   storing tenant-specific content in respective tenant namespaces, the tenant-specific content comprising first content of the first tenant system stored in a first tenant namespace, and second content of the second tenant system stored in a second tenant namespace, the first content having a first fully qualified name associated therewith and comprising the first tenant namespace, and the second content having a second fully qualified name associated therewith and comprising the second tenant namespace;
   storing, by the one or more processors, shared content in a shared namespace, the shared content comprising content that is not specific to a tenant in the plurality of tenant systems;
   storing a shared data model provided as an object-oriented data model in the shared namespace, the object-oriented shared data model being shared across a plurality of tenant namespaces and comprising two or more data objects, and one or more associations between data objects, each association connecting data objects from one of the first tenant namespace and the second tenant namespace to the shared namespace, one or more rules being applied to the object-oriented shared data model to ensure associations across namespace boundaries do not violate strict data separation between tenants; and
   processing a request received from one of the first tenant system and the second tenant system based on the object-oriented shared data model, the shared content, and one of the first content and the second content to provide a response, the request being mapped to the one of the first tenant system and the second tenant system by a reverse proxy using one of the first fully qualified name and the second fully qualified name, respectively, the response comprising data of one of the first content and the second content in the shared data model with the shared content and selectively including a namespace.

16. The system of claim 15, wherein processing the request comprises determining that the request originates from a tenant context, and comprises a write operation to the object-oriented data model, and in response, denying the request.

17. The system of claim 15, wherein processing the request comprises determining that the request comprises a write operation to tenant-specific content, and in response, performing the write operation on one of the first content and the second content.

18. The system of claim 15, wherein each of the tenant namespaces comprises a using namespace that points to the shared namespace.

19. The system of claim 18, wherein processing the request comprises determining that the request comprises one or more of a read operation on the object-oriented data model and data classified by the data model as shared, and in response directing the read operation to the shared namespace.

20. The system of claim 15, wherein the computer-implemented system comprises a landscape management system that manages system landscapes of each tenant system in the plurality of tenant systems.

* * * * *